US007760911B2

(12) United States Patent
Xiao et al.

(10) Patent No.: US 7,760,911 B2
(45) Date of Patent: Jul. 20, 2010

(54) METHOD AND SYSTEM FOR SEGMENT-BASED OPTICAL FLOW ESTIMATION

(75) Inventors: Jiangjian Xiao, Plainsboro, NJ (US); Hui Cheng, Bridgewater, NJ (US)

(73) Assignee: Sarnoff Corporation, Princeton, NJ (US)

( * ) Notice: Subject to any disclaimer, the term of this patent is extended or adjusted under 35 U.S.C. 154(b) by 693 days.

(21) Appl. No.: 11/521,109

(22) Filed: Sep. 14, 2006

(65) Prior Publication Data

US 2007/0092122 A1     Apr. 26, 2007

Related U.S. Application Data (60) Provisional application No. 60/717,494, filed on Sep. 15, 2005.

(51) Int. Cl.
    *G06K 9/00*      (2006.01)
    *H04N 5/30*      (2006.01)
(52) U.S. Cl. ...................... 382/107; 348/162
(58) Field of Classification Search ............... 382/103, 382/107, 128, 167, 171, 173, 177, 179, 240, 382/260–265; 348/14.13, 69, 169–172, 460, 348/471, 568, 575; 380/212, 217, 269
See application file for complete search history.

(56) References Cited

U.S. PATENT DOCUMENTS 6,985,620 B2 * 1/2006 Sawhney et al. ............ 382/154

7,587,099 B2 * 9/2009 Szeliski et al. ............ 382/275

OTHER PUBLICATIONS

Horn, B., et al., "Determining optical flow," Artificial Intelligence, vol. 17, pp. 185-203 (1981).
Lucas, B., et al., "An Iterative Image Registration Technique with an Application to Stereo Vision," International Joint Conference on Artificial Intelligence, pp. 674-679 (1981).
Alvarez, L., et al., "Symmetrical dense optical flow estimation with occlusions detection," European Conference on Computer Vision, pp. 721-735 (2002).
Strecha, C., et al., "A probabilistic approach to large displacement optical flow and occlusion detection," Workshop on Statistical Methods in Video Processing, pp. 1-11 (2004).
Perona, P., et al., "Scale-space and edge detection using anisotropic diffusion," IEEE Trans. on Pattern Analysis and Machine Intelligence, vol. 12, No. 7, pp. 629-639 (Jul. 1990).

(Continued)

*Primary Examiner*—Abolfazl Tabatabai
(74) *Attorney, Agent, or Firm*—Lowenstein Sandler PC (57) ABSTRACT

The methods and systems of the present invention enable the estimation of optical flow by performing color segmentation and adaptive bilateral filtering to regularize the flow field to achieve a more accurate flow field estimation. After creating pyramid models for two input image frames, color segmentation is performed. Next, starting from a top level of the pyramid, additive flow vectors are iteratively estimated between the reference frames by a process including occlusion detection, wherein the symmetric property of backward and forward flow is enforced for the non-occluded regions. Next, a final estimated optical flow field is generated by expanding the current pyramid level to the next lower level and the repeating the process until the lowest level is reached. This approach not only generates efficient spatial-coherent flow fields, but also accurately locates flow discontinuities along the motion boundaries.

15 Claims, 4 Drawing Sheets

OTHER PUBLICATIONS

Black, M., et al., "Robust anisotropic diffusion," IEEE Trans. on Image Processing, vol. 7, No. 3, pp. 421-432 (Mar. 1998).

Tschumperle, D. et al., "Vector-valued image regularization with pde's: A common framework for different applications," Computer Vision and Pattern Recognition (2003).

Brox, T., et al., "High accuracy optical flow estimation based on a theory for warping," European Conference on Computer Vision, pp. 25-36 (May 2004).

Deriche, R., et al., "Optical-flow estimation while preserving its discontinuities: a variational approach," Asian Conference on Computer Vision (1995).

Barron, J., et al., "Performance of optical flow techniques," International Journal of Computer Vision, vol. 12, pp. 43-77 (1994).

McCane, B., et al., "On benchmarking optical flow," Computer Vision and Image Understanding, vol. 84, pp. 126-143 (2001).

Weichert, J., et al., "Variational optic flow computation with a spatio-temporal smoothness constraint," Journal of Mathematical Imaging and Vision, vol. 14, pp. 245-255 (2001).

Comaniciu, D., et al., "Mean shift: A robust approach toward feature space analysis," IEEE Trans. on Pattern Analysis and Machine Intelligence, vol. 24, No. 5, pp. 603-619 (May 2002).

* cited by examiner

METHOD AND SYSTEM FOR SEGMENT-BASED OPTICAL FLOW ESTIMATION

CROSS REFERENCE TO RELATED APPLICATION

This application claims the benefit of U.S. Provisional Application Ser. No. 60/717,494 filed on Sep. 15, 2005. The entire disclosure of U.S. Provisional Application Ser. No. 60/717,494 is incorporated by reference herein.

STATEMENT REGARDING FEDERALLY SPONSORED RESEARCH OR DEVELOPMENT

This invention was made with U.S. government support under contract number NIST 70NANB3H3053. The U.S. government has certain rights in this invention.

FIELD OF THE INVENTION

The present invention relates generally to video processing, and more-particularly to video compression, object estimation, and object tracking.

BACKGROUND OF THE INVENTION

In many applications the transmission of uncompressed video is impractical due to limitations in the amount of bandwidth available and the expense related to use of the bandwidth. As a result, a more efficient way of transmitting video is to compress the video prior to transmission. Advantageously, because video material is highly redundant, it can be efficiently compressed using a conventional video coding standard, such as, for example, H.264/JVT/AVC/MPEG-4 part 10.

This compression standard achieves approximately 50% better compression performance as compared with the previous state of the art compression standards, such as, for example, MPEG-4 or H.263. However, even with these gains, better compression is still desired. For example, a cable or satellite company with certain available bandwidth may offer customers more video channels if better compression techniques were available which provided high quality transmissions.

One of the approaches for improving video compression, first introduced in H.263, is the Reduced Resolution Update (RRU) technique. In this mode, some of the video frame's residual data is coded at a reduced resolution, thus substantially reducing the amount of data that is transmitted in each frame. However, disadvantageously, because the entire frame residual must be coded at either full or reduced resolution (i.e., affecting all inter and intra macroblocks), the decision to employ the reduced resolution mode is made on a per-frame basis. As such, although substantial bit savings may only be achieved for some frames, no bit savings is achieved for others.

Another important technique used to reduce transmission bit rate is motion estimation. One conventional motion estimation method, H.264, is restricted to a simple translation model, which fails if the scene has complex motion. However, in many practical applications, the motion field may vary greatly between different scenes, such as a 3D scene or dynamic scene. As such, it is extremely difficult to use one or two models to describe the general scenes.

Using conventional variational approaches to estimating optical flow between two frames results in an over-smoothed estimation wherein the discontinuities and occlusion areas between different motion fields (or layers) are not distinguished, even with an anisotropic diffusion operator. As a result, it is difficult to generate a high-quality disposable frame using the estimated flow field. Due to the aperture problem of optical flow estimation, the larger region of integration is more preferable to produce stable motion estimation while it is also more likely to contain multiple motions in this region, which may introduce serious error.

According to an exemplary conventional variational model for optical flow estimation, a standard brightness constancy assumption may be applied, wherein the image brightness of a pixel at $x=[x\ y]^T$ is independent of the motion vector $u=[u\ v]^T$, such that $$I_1(x) = I_2(x+u)$$

See e.g., Horn, B., et al. "*Determining optical flow,*" *Artificial Intelligence*, Volume 17, pages 185-203 (1981); and Lucas, B., et al. "*An iterative image registration technique with an application to stereo vision,*" *International Joint Conference on Artificial Intelligence*, pages 674-679 (1981).

Accordingly, the optical flow is estimated by minimizing the following data energy function:

$$E_d(u) = \int_\Omega (I_1(x) - I_2(x+u))^2\, dx,$$

where $\Omega$ is the spatial image domain. Using Taylor expansion, the above equation may be approximated by the first order terms as:

$$E_d(u) = \int_\Omega ((\nabla I)^T u + I_t)^2\, dx$$

where $\nabla I$ is spatial image gradient, and $I_t$ is temporal image gradient.

In order to address aperture problems and suppress noise during flow estimation, an edge-preserving anisotropic smoothness term is added to the energy function such that:

$$E(u) = E_d(u) + E_s(u) = \int_\Omega ((\nabla I)^T u + I_t)^2\, dx + \int_\Omega \nabla u^T D(\nabla I_1) \nabla u\, dx,$$

where the anisotropic diffusion tensor $D(\nabla I_1)$ is a defined by $$D(\nabla I_1) = \frac{1}{\|\nabla I_1\|^2 + 2v^2}\left(\begin{bmatrix}\frac{\partial I_1}{\partial y_1} \\ -\frac{\partial I_1}{\partial x_1}\end{bmatrix}\begin{bmatrix}-\frac{\partial I_1}{\partial x_1} \\ \frac{\partial I_1}{\partial y_1}\end{bmatrix}^T + v^2 1\right),$$

where 1 is the identity matrix, and where $v$ is a parameter to control the degree of isotropy smoothness. To minimize the energy functional, the partial derivative of $$\frac{\partial E}{\partial u}$$

may be computed and the flow field may be iteratively updated, according to the following expression:

$$\frac{\partial E}{\partial u} = \frac{\partial E_d}{\partial u} + \frac{\partial E_s}{\partial u} = (\nabla I^T u + I_t)\nabla I^T + div(D(\nabla I_1)\nabla u)$$

Therefore, the flow field, $u^\tau$, at the iteration step $\tau$, may be updated by the following expression:

$$\frac{\partial u}{\partial \tau} = u^\tau - u^{\tau-1} = -\frac{\partial E}{\partial u}$$

Instead of using one-step update of $u^\tau$, the update may be separated into a two-step process, such that $$u^{\tau'} - u^{\tau-1} = -\frac{\partial E_d}{\partial u} = -(\nabla I^T u^{\tau-1} + I_t)\nabla I^T,$$

$$\text{and } u^\tau - u^{\tau'} = -\frac{\partial E_s}{\partial u} = -div(D(\nabla I_1)\nabla u)$$

where the second step can be substituted by an oriented Gaussian convolution such that $$u^\tau = u^{\tau'} * G(T, \Delta \tau),$$

where $$G(T, \Delta\tau) = \frac{1}{4\pi\Delta\tau}\exp\left(-\frac{x^T T^{-1} x}{4\Delta\tau}\right);$$

where T is the structure tensor, such that $T = \lambda_\eta \eta\eta^T + \lambda_\xi \xi\xi^T$ and $\lambda_\eta$, and $\lambda_\xi$ are eigenvalues of diffusion tensor $D(\nabla I_1)$, $\eta$ and $\xi$ are the corresponding orthogonal eigenvectors.

However, when motion displacement is more than one pixel, the minimization using the above described conventional variational framework may be trapped in a local minimum.

One significant problem with the conventional variational model is that it is adapted to minimize the squared intensity error or data energy for every pixel, regardless if the pixel is occluded or not. As a result, the warped image, $I_2(x+u)$, performs incorrect deformation to fill the occluded area of frame $I_1(x)$ even though no corresponding pixel at $I_2$ can match the occluded pixel x at the first frame. However, when there is a large occlusion between two images, this minimization produces serious distortion and/or dragging. For example, if there is a large motion difference between two neighboring regions, the weak-textured regions are dragged to follow the movement of the high-gradient region boundaries.

According to an example, if the camera has apparent zooming or pan then a larger number of pixels should be detected as occluded at the image boundary. However, according to the conventional model, the energy of those pixels is minimized, thus causing significant distortion along the image boundary.

Furthermore, even though several different anisotropic smoothness terms may be introduced into the energy function in the conventional methods and algorithms, it is still difficult to obtain highly discontinuous flow field due to the unclear occlusion process. (See, e.g., Alvarez, L., et al., "*Symmetrical dense optical flow estimation with occlusion detection,*" European Conference on Computer Vision (2002); Strecha, C., et al. "*A probabilistic approach to large displacement optical flow and occlusion detection,*" Workshop on Statistical Methods in Video Processing.(2004); Pemoa, P., et al. "*Scale-space and edge detection using anisotropic diffusion,*" IEEE Trans. on Pattern Analysis and Machine Intelligence, Volume 12, pages 629-639 (1990); Black, M., et al. "*Robust anisotropic diffusion,*" IEEE Trans. on Image Processing Volume 7, pages 421-432 (1998); and Tschumperle, D., et al. "*Vector-valued image regularization with pde's: A common framework for different applications,*" Computer Vision and Pattern Recognition (2003).

Specifically, many conventional methods fail to address the occlusion problem of the optical estimation (See e.g., Horn, B., et al. "*Determining optical flow,*" Artificial Intelligence Volume 17 pages 185-203 (1981); Lucas, B., et al. "*An iterative image registration technique with an application to stereo vision,*" International Joint Conference on Artificial Intelligence, pages 674-679 (1981); Brox, T., et al., "*High accuracy optical flow estimation based on a theory for warping,*" European Conference on Computer Vision, pages 25-36 (2004); Deriche, R., et al., "*Optical-flow estimation while preserving its discontinuities: a variational approach,*" Asian Conference on Computer Vision, pages 290-2955 (1995); Barron, J., et al., "*Performance of optical flow techniques,*" International Journal of Computer Vision, Volume 12, pages 43-77 (1994); McCane, B., et al. "*On benchmarking optical flow,*" Computer Vision and Image Understanding, Volume 84, pages 126-143 (2001); and Weickert, J., et al., "*Variational optic flow computation with a spatio-temporal smoothness constraint,*" Journal of Mathematical Imaging and Vision, Volume 14, pages 245-255 (2001).

As such, there is a need in the art for an improved optical flow estimation method which includes an efficient anisotropic smoothness constraint such that it not only maintains piecewise spatial coherence but also maintains accurate flow discontinuities over the motion boundaries.

SUMMARY OF THE INVENTION

The above-described problems are addressed and a technical solution is achieved in the art by a system and a method that provides for segment based optical flow estimation. According to an embodiment of the present invention, color segmentation and an adaptive bilateral filtering are used to regularize the flow field to achieve a more accurate flow field.

According to an embodiment of the present invention, two or more frames of an input video stream are analyzed and processed to produce improved optical flow fields for each frame which includes both forward flow and backward flow.

According to an embodiment of the present invention, the optical flow estimation method of the present invention includes color segmentation, the enforcement of a symmetric constraint, occlusion detection, and adaptive bilateral filtering. Advantageously, the method according to the present invention provides for a spatial-coherent flow field while also locating the accurate flow discontinuities along the motion boundaries.

According to an embodiment of the present invention, a method is provided for analyzing at least two image frames ($I_1$ and $I_2$) of input video stream to estimate the optical flow fields for each frame. For each frame, a pyramid model (e.g., a Gaussian pyramid) is generated. Next, for each pyramid level, color segmentation is performed to group pixels having similar color(s) into a uniform region. Then, starting from the top level of the pyramid model for each of the two reference frames, the forward optical flow ($u_1$) and the backward optical flow ($u_2$) of the two frames is estimated. Furthermore, the occluded regions between the two image frames is detected. Next, a color-based bilateral filtering is applied to the forward flow estimation and the backward flow estimation to regulate the estimated flow field and determine flow vectors for the occluded regions.

Next, applying and enforcing the following symmetrical property: $u_1 = -u_2$, the estimated flow is refined by repeating the estimation process for any number of iterations (e.g., m iterations).

According to an embodiment of the present invention, the occlusion in the energy function and detect the occlusion areas between the piecewise-smoothed flow fields, which efficiently breaks the spatial coherence over the motion boundaries. Based on accurate flow estimation, a high-quality disposable frame is synthesized to effectively reduce the transmission redundancy in the videos.

According to an embodiment of the present invention, the flow smoothness is restricted inside each solid color segmented region and an adaptive bilateral filter is applied to correct the motion flow for the occluded pixels.

In video compression and transmission, some frames are encoded with low bits and partially recovered from the other frames. Due to the limit in bandwidth, this type of frame may be disposed without seriously deteriorating the quality of the video stream. As such, these frames are referred to as disposable frames. According to an embodiment of the present invention, in order to handle scenes with complex motion, a method is provided for estimating optical flow based motion wherein the motion field between the reference frames is computed and the disposable non-reference frames are interpolated, to further save the bits for transmission.

The present invention further relates to a system for performing efficient and accurate segment-based optical flow estimation. The system comprises one or more modules configured to perform the steps of the method described herein. One having ordinary skill in the art will appreciate that the one or modules of the optical flow estimation system of the present invention may be comprised of one or more computers. As used herein, the term "computer" is intended to include, but is not limited to any data processing device, such as a desktop computer, a laptop computer, a mainframe computer, a personal digital assistant, a server, a handheld device, or any other device able to process data.

BRIEF DESCRIPTION OF THE DRAWINGS

The present invention will be more readily understood from the detailed description of exemplary embodiments presented below considered in conjunction with the attached drawings, of which.

It is to be understood that the attached drawings are for purposes of illustrating the concepts of the invention and may not be to scale.

DETAILED DESCRIPTION OF THE INVENTION

The present invention provides a more efficient optical flow estimation process which includes the use of color segmentation and adaptive bilateral filtering to regularize the flow field to achieve a more accurate flow field. As used herein, the term "optical flow," includes but is not limited to a technique, parameter, or measure which estimates the motion of one or more objects within a visual representation. Typically, the motion is represented as one or more vectors originating or terminating at pixels between two input images. As used herein, the term "flow field" or "flow vector field" includes, but is not limited to, a collection of 2D motion flow vectors, wherein each 2D motion flow vector corresponds to a pixel in an image.

According to the present invention, the occlusion is formulated in an energy function of a variational algorithm in order to detect the occlusion areas between the piecewise-smoothed flow fields, which efficiently breaks the spatial coherence over the motion boundaries. As used herein, the term "energy function" includes, but is not limited to, a convex function which maintains a positive value, wherein the error is considered as energy. The optimized solution of this function can also be viewed as an energy minimization process.

Based on accurate flow estimation, a high-quality disposable frame is synthesized to effectively reduce the transmission redundancy in the videos.

According to an embodiment of the present invention, a symmetrical property between forward and backward flow is enforced to explicitly identify occlusions or mismatches. Then, the flow smoothness is restricted inside each solid color segmented region and an adaptive bilateral filter is applied to correct the motion flow for the occluded pixels. According to an embodiment of the present invention, the energy function is reformulated by introducing an occlusion term, which effectively compensates for the energy rising due to the mismatches. The methods and systems of the present invention may be applied to video streams in many applications, including, but not limited to, movies, television, surveillance video.

Figure 1:
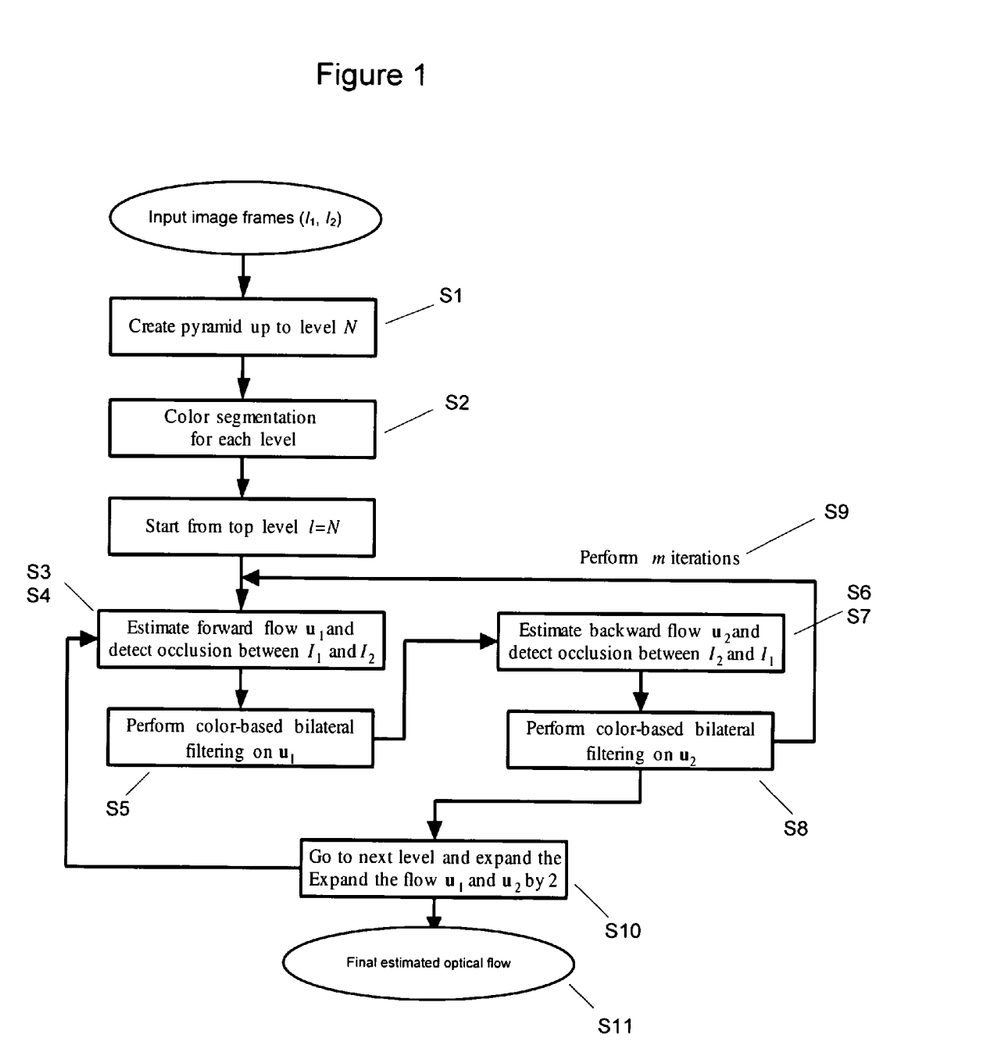
FIG. 1 illustrates a process flow of an exemplary optical flow estimation method, according to an embodiment of the present invention.

FIG. 1 illustrates an exemplary method for estimating the optical flow or optical flow fields of one or more frames of a video stream. One having ordinary skill in the art will appreciate that the step numbers are provided for reference only, and do not necessarily indicate that the order implied by the numbering need be followed. As such, the steps set forth in FIG. 1 and described in detail below may be performed in alternative orders.

According to an embodiment of the present invention, the method provides for an optical flow estimation for two individual frames from the input video stream, herein referred to a first image frame (denoted as $I_1$) and a second image frame (denoted as $I_2$). One having ordinary skill in the art will appreciate that although this description refers to two image frames, any number of frames may be analyzed by the methods and systems of the present invention.

Referring to FIG. 1, the two input images (first frame $I_1$ and second frame $I_2$) of the video stream are received and a pyramid model for each image is generated, as shown in step S1. One having ordinary skill in the art will appreciate that pyramid modeling is a technique used in image processing wherein a frame is broken down into a number of pyramids. According to this approach, a series of images are created that are weighted down using a Gaussian average and then scaled down. When this technique is applied iteratively, a stack of successively smaller images is created, with each pixel of the image containing a local average that corresponds to a pixel neighborhood on a lower level of the pyramid, as shown in FIG. 2.

Figure 2:
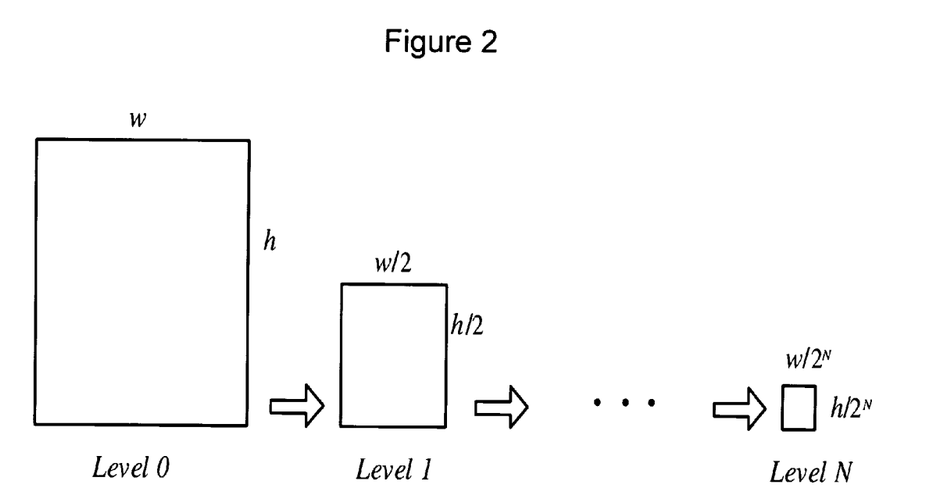
FIG. 2 illustrates an exemplary pyramid modeling, according to an embodiment of the present invention.

Referring to FIG. 2, for each upper level image (i.e., Level N), the image is down-sampled to generate a new image that is half the size of the previous level (i.e., the Level 1 image is half the size of the Level 0 image). As shown in FIG. 2, the width (w) and the height (h) of each level is equal to ½ the size of the previous level. In order to find the global minimum, the pyramid modeling is used to down sample the input image, thus allowing a coarse-to-fine strategy to be applied from the top level to the bottom level of the pyramid.

Next, in step S2, after creating the pyramid models for the two input reference frames, a color segmentation process is applied at each pyramid level to group similarly colored pixels into a uniform region. According to an embodiment of the present invention, the color segmentation may be performed by any suitable method or technique, such as, for example, by a mean-shift process. See e.g., Comaniciu, D. et al., "*Mean shift: A robust approach toward feature space analysis,*" *IEEE Trans. on Pattern Analysis and Machine Intelligence*, Volume 24, pages 603-619 (2002).

According to an embodiment of the present invention, a mean-shift process is applied to obtain a piecewise color segmentation for each pyramid level.

Next, an optical flow estimation is performed wherein the forward optical flow $u_1$ and the backward optical flow $u_2$ are estimated. According to an embodiment of the present invention, in steps S3 and S6, respectively, starting from the top level pyramid (i.e., Level N), the forward optical flow $u_1$ and backward optical flow $u_2$ are estimated between reference frames $I_1$ and $I_2$. Given a flow field (e.g., $u_1$), a suitable warping technique may be applied to re-project the second frame $I_2$ by the flow field $u_1$ to obtain a new image, referred to as a warping image, which is similar to image $I_1$. The warping image or warping frame may be denoted as $I_2(x+u_1)$. As such, the forward flow $u_1$ may be expressed in terms of its warping frame, as provided in the following equation:

$$I_1(x)=I_2(x+u_1).$$

Furthermore, the backward flow $u_2$ may be expressed in terms of the following equation:

$$I_2(x)=I_1(x+u_2).$$

Further, for non-occluded pixels, the forward flow is equal to the backward flow. The relationship wherein the forward flow equals the backward flow is referred to herein in as the "symmetric constraint."

According to an embodiment of the present invention, the forward flow and backward flow are estimated using an improved approach to the conventional variational model of optical flow estimation (see background). To address the problem with the conventional variational model caused by occluded pixels, the estimation method of the present invention excludes the occluded pixels from the minimization process and adds a corresponding penalty into the energy functional to balance occlusion and visibility. Specifically, an occlusion term is added into the conventional variational model, such that:

$$E(u_1, u_2)=E_1(u_1|u_2)+E_2(u_2|u_1),$$

where $u_1$ is the forward flow,
where $u_2$ is the backward flow, and
where $E_1(u_1|u_2)$ is the energy term of forward flow estimation between frame I1 and I2 given the backward flow $u_2$, and $E_2(u_2|u_1)$ is the energy term of backward flow estimation between frame 2 and 1 given the forward flow $u_1$.

After explicitly introducing an occlusion function H(x) of pixel x, we can rewrite the energy term as $$E_1(u_1|u_2)=E_{d1}(u_1)\cdot\rho(u_1)+E_{oc}\cdot(1-\rho(u_1))+E_{s1}(u_1),$$

$$E_2(u_2|u_1)=E_{d2}(u_2)\cdot\rho(u_2)+E_{oc}\cdot(1-\rho(u_2))+E_{s2}(u_2)$$

where $E_{d1}$ and $E_{s1}$ are the data and smoothness energy for flow estimation between the first frame ($I_1$) and the second frame ($I_2$);
where $E_{d2}$ and $E_{s2}$ are the data and smoothness energy for flow estimation between the second frame ($I_2$) and the first frame ($I_1$); and
where $E_{oc}$ is a constant parameter to simulate the occlusion penalty when the pixel is occluded.
$\rho(u)$ works as a heave-side function to determine if the pixel is occluded.

If the pixel is occluded, $\rho(u)$ is equal to one and an occlusion penalty is added into the overall energy equation. On the other side, if the pixel is visible between two frames, $\rho(u)$ is set to zero and no occlusion penalty is added into $E(u_1, u_2)$.

As shown by the above equation, when the occlusion penalty $E_{oc}$ increases, the occlusion detection becomes more difficult, and thus fewer pixels are detected as occluded.

Therefore, an appropriate occlusion penalty is added to balance energies between the occlusion and data terms, and correctly locate the occlusion regions. The data and smoothness energy terms are similar to the conventional variational methods (see e.g., conventional method described in background section), such that $$E_{d1}(u_1) = \int_\Omega (I_1(x)-I_2(x+u_1(x))^2\, dx, \text{ and } E_{s1}(u_1)=\int_\Omega \nabla u_1^T D(\nabla I_1)\nabla u_1\, dx$$

Referring to FIG. 1, in steps S4 and S7, the occlusion is detected between $I_1$ and $I_2$ (step S4) and $I_2$ and $I_1$ (step S7). According to an embodiment of the present invention, two primary types of occlusion occurring in optical flow estimation are detected. The first type is motion occlusion, wherein the occlusion areas are not overlapped at the same location due to the motion vectors. The second type is mismatching, wherein each image has an occlusion region and the occluded regions are overlapped at the same position. One having ordinary skill in the art will appreciate that the mismatching may happen due to a number of different conditions, such as, for example, object appearing/disappearing, shadow, color change, or large object deformation (shrinking or expanding), etc.

One conventional way to detect the occlusion is to check the consistency between the forward flow and backward flow. If the backward and forward flow is constant, the pixel will be considered as non-occluded. See e.g., Alvarez, L. et al., "*Symmetrical dense optical flow estimation with occlusion detection*," European Conference on Computer Vision (2002). However, this forward-backward matching may not be reliable for many applications, such as mismatching where the flow inside the both overlapping occluded regions is zero. As a result, the forward-backward flow may be consistent in these regions and the detector calms such regions as non-occluded.

According to an embodiment of the present invention, occlusion detection is performed for both cases describe above by employing the squared image residue, as provided in the following expression:

$$\rho(u_1) = \begin{cases} 0, & \text{if } (I_1(x) - I_1(x+u_1))^2 > \varepsilon_1 \\ 1, & \text{otherwise} \end{cases}$$

where $\varepsilon_1$, is a threshold to decide the occlusion;
wherein $\rho=0$ denotes that the pixel is occluded, and
where $\rho=1$ denotes the pixel is visible in both frames.

In order to obtain a continuous function of $\rho(u_1)$, a numerical approximation of a heaveside function is used, such that:

$$\rho(u_1) = \frac{1}{2} + \frac{1}{\pi}\tan^{-1}((I_1(x) - I_1(x+u_1))^2 - \varepsilon_1).$$

Figure 3:
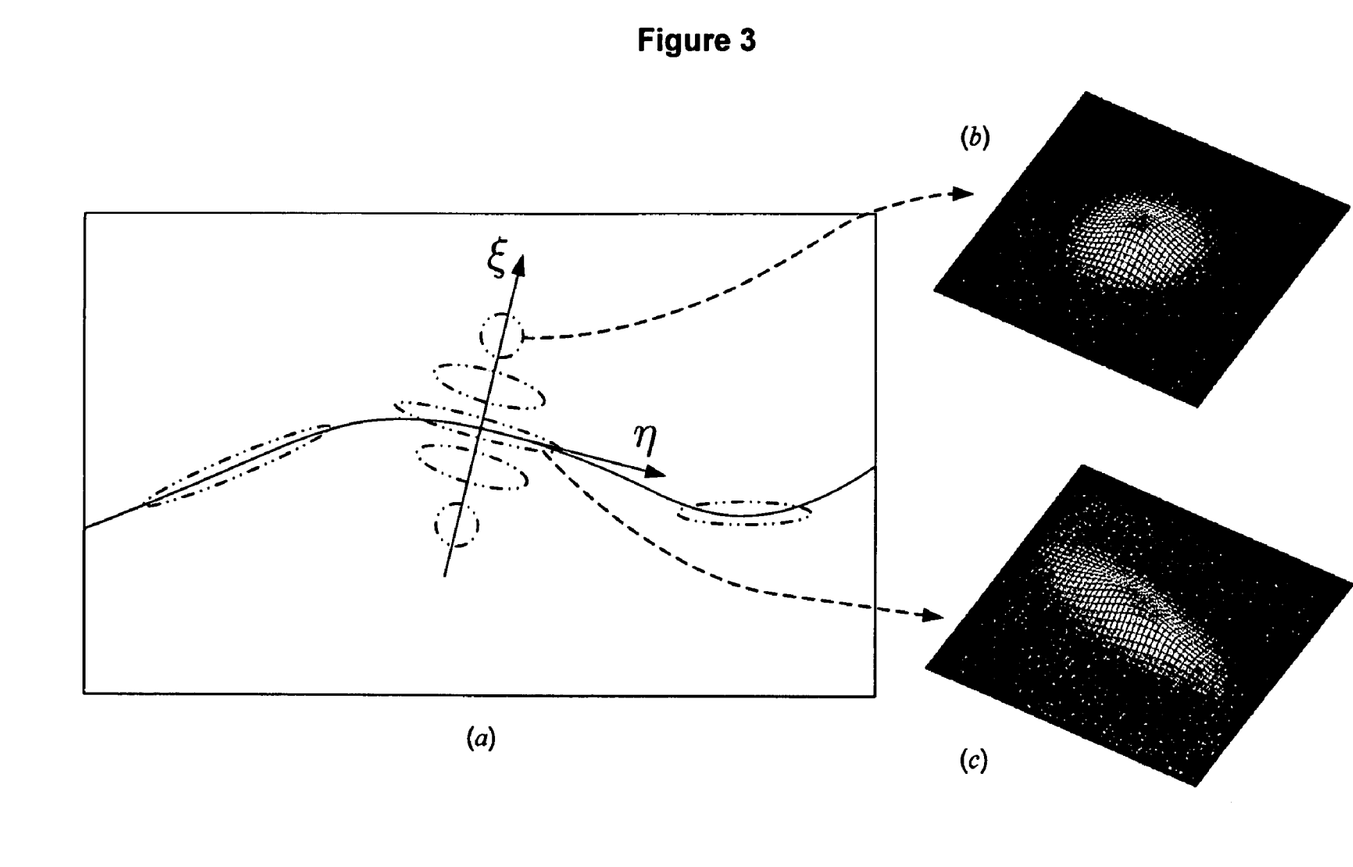
FIG. 3A illustrates an exemplary anistropic diffusion representation on an input image where the image is partitioned into two color regions, according to an embodiment of the present invention.
FIGS. 3B and 3C illustrate the 3D shape of the corresponding kernels, according to an embodiment of the present invention.

Next, in steps S5 and S8, color-based bilateral filtering is performed on $u_1$ and $u_2$, respectively. One having ordinary skill in the art will appreciate that the Gaussian kernel at different locations varies due to the varied structure tensor (T) (i.e., along the eigenvector direction $\eta$ and $\xi$, as shown in FIG. 3A). FIG. 3A illustrates an exemplary anisotropic diffusion representation on an input image where the image is partitioned into two color regions. The anistropic diffusion kernel has a different size and shape for each pixel. When the pixel is close to partition boundary, the kernel shape stretches (in length) along the boundary direction and squeezes along the perpendicular direction of the boundary. Further, the radius of the oriented Gaussian kernel also depend on the eigenvalues of $T^{-1}$, which are $$\frac{1}{\lambda_\eta} \text{ and } \frac{1}{\lambda_\xi}.$$

When the pixel is located at the interior of a smooth region, $\|\nabla I_1\|$ is small and $$\lambda_\eta \approx \lambda_\xi \approx \frac{1}{2},$$

which is equivalent to applying an isotropic Gaussian kernel for the smoothing, as shown in FIG. 3B. If the pixel is located at the sharp boundary between two segments, $\|\nabla I_1\|$ is large and $\lambda_\xi \approx 1 \gg \lambda_\eta \approx 0$, which is equivalent to applying an oriented Gaussian kernel on the images as shown in FIG. 3C.

However, this anisotropic diffusion process cannot handle occlusion region very well during the optical flow estimation.

Figure 4:
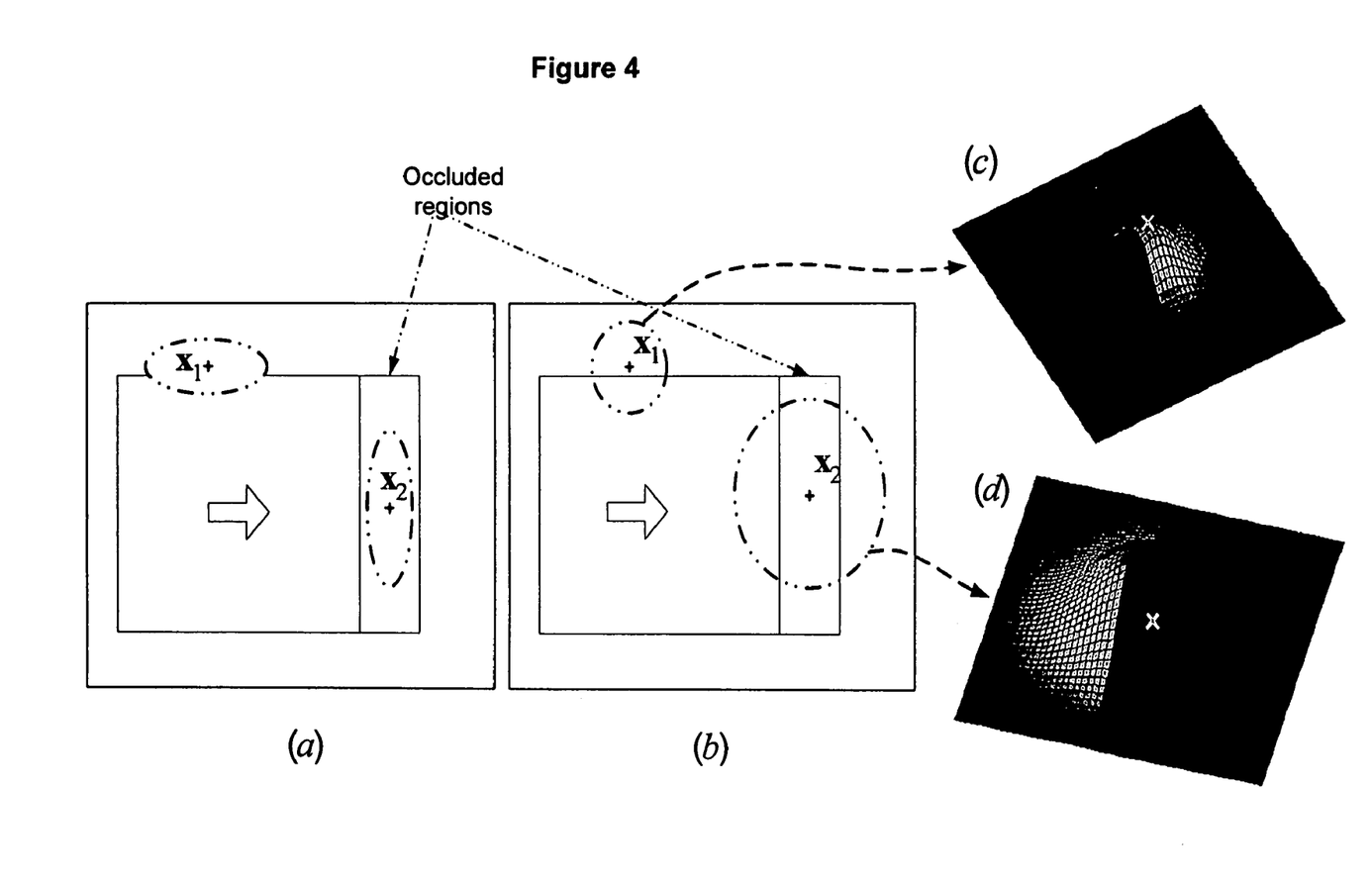
FIG. 4A illustrates an exemplary anistropic diffusion representation generated according to a conventional variational-based approach.
FIG. 4B illustrates an anisotropic diffusion representation generated by an exemplary adaptive bilateral filer, according to an embodiment of the present invention.
FIGS. 4C and 4D illustrate 3D visualization of the two bilateral filter kernels depicted in FIG. 4B, wherein the "x" or cross denote the kernel centers corresponding to $x_1$ and $x_2$, respectively.

FIG. 4A shows two kinds of mishandling of the variational-based anisotropic diffusion according to conventional methods, wherein Region 1 is moving from the left to the right (as shown by the arrow) and the Region 2 is occluded region. In the first case, when the oriented Gaussian kernel is located at the pixel, $x_1$, around the high-gradient motion boundary without occlusion, the diffusion process uses the flow information from the other regions to estimate its flow vector. The flow influence from Region 1 may dramatically distort the flow field in the (white) background region. In the second case, where the pixel $x_2$ is located at the occluded region, the radius of the oriented Gaussian kernel may not large enough to cover the size of occlusion area. In such cases, the only information used for the flow estimation is from the occluded region where the flow field is not reliable at all.

Therefore, according to an embodiment of the present invention, an improved diffusion process is provided which adaptively controls the diffusion process and minimizes the influence from the other regions which are not consistent with the current location.

According to one embodiment of the present invention, the regional affinity is enforced by grouping similar pixels together. In one example, a mean-shift color segmentation process (such as, for example, the process described in Comaniciu et al.) is applied to partition the pixels to different segments and assume each segment has a continuous motion field. Then, a multi-cue driven, adaptive bilateral filter (such as, for example, the filter described in Tomasi et al.) may be designed to block the flow propagation between different regions in the first case, and infer the motion vectors for the occluded regions from the surrounding non-occluded pixels in the second case, as shown in FIG. 4B. As a result, the isotropic Gaussian kernel is truncated into two parts. The first part is the support region, wherein the motion information is used to estimation the flow vector for pixels $x_i$. The remaining part is the non-support region and its information is discarded during the flow estimation of pixels $x_i$.

Based on the color segmentation (step S2 in FIG. 1) and occlusion detection (steps S4 and S7 in FIG. 1), the bilateral filter of the present invention is able to adaptively change the spatial kernel size to update optical flow $u^\tau$ such that $$u^\tau = u^{\tau^*} * G_s(\sigma_s(\rho,\zeta)) * G_1(\sigma_1) * \rho$$

where $G_1(\sigma_1)$ is an intensity kernel which controlled by the color index of the color segmentation, and
where $G_s(\sigma_s(\rho,\zeta))$ is a spatial kernel which is adaptively changed by occlusion detection $\rho$, and segment radius, $\zeta$, such that $$\sigma_s(\rho,\varsigma) = \begin{cases} 1, & \text{if } \rho = 1 \\ \frac{\varsigma}{3}, & \text{otherwise} \end{cases}$$

In the above equation, $\sigma_s(\rho,\zeta)$ may be changed under two cases which are consistent to FIG. 6.*b*. In the first case, $\rho=1$, the pixel is located at the non-occluded area where the estimated flow is reliable. With the truncation by color segmentation convolution $G_1(\sigma_1)$, a small Gaussian kernel with $\sigma_s(\rho,\zeta)=1$ is sufficiently reliable for the diffusion process as shown at position $x_1$ in FIG. 3B. For the second case, $\rho=0$, the pixel is located at the non-occluded area where the estimated flow is unreliable. Therefore, using $G_1(\sigma_1)*\rho$, the flow influence may be truncated out from this unreliable region and other color segments. Then, with a large Gaussian kernel, $$\sigma_s(\rho, \varsigma) = \frac{\varsigma}{3},$$

the flow influence from the outside of the occluded area is collected and the optical flow at such pixel is correctly estimated as shown at position $x_2$ in FIG. 3C.

According to an embodiment of the present invention, for the non-occluded regions, the symmetrical constraint ($u_1=-u_2$) is enforced to refine the estimated forward optical flow and the backward optical flow. According to an embodiment of the present invention, in step S9, the estimated optical flow may be refined by iteratively performing steps S3-S8 for any number of iterations (FIG. 1 illustrates an exemplary method wherein m iterations are performed.)

According to an embodiment of the present invention, in step S10, for the next level of the pyramid model, the forward optical flow and the backward optical flow are expanded by a suitable factor (e.g., a factor of two), and steps S3-S9 are performed until the bottom level is reached. In step S11, when the bottom level of the pyramid is reached, a final estimated optical flow is generated.

According to an embodiment of the present invention, the optical flow estimation method is configured to obtain sharp motion discontinuities between different flow fields and maintain the continuous flow inside each flow fields as before. Furthermore, using the estimated optical flow field, high-quality tweening frame may be generated.

The present invention also relates to an optical flow estimation system. According to an embodiment of the present invention, the system comprises one or more modules configured to perform the steps of the process described in detail above. One having ordinary skill in the art will appreciate that the one or modules may comprise computer and/or human-based components.

It is to be understood that the exemplary embodiments are merely illustrative of the invention and that many variations of the above-described embodiments may be devised by one skilled in the art without departing from the scope of the invention. It is therefore intended that all such variations be included within the scope of the following claims and their equivalents.

What is claimed is:

1. A method for estimating optical flow based on a first image frame and a second image frame of an input video stream, the method comprising the steps of:
    (a) generating a pyramid model for each of the first image frame and the second image frame, wherein each pyramid model comprises a plurality of levels;
    (b) performing color segmentation for each level of the pyramid models to produce a plurality of color-segmented regions;
    (c) estimating a forward optical flow between the first image frame and the second image frame, wherein the estimation comprises detecting at least one occluded region between the first image frame and the second image frame;
    (d) performing color-based bilateral filtering on the estimated forward optical flow;
    (e) estimating a backward optical flow between the second image frame and the first image frame, wherein the estimation comprises detecting at least one occluded region between the second image frame and the first image frame;
    (f) performing color-based bilateral filtering on the estimated backward optical flow;
    (g) refining the estimated forward optical flow and backward optical flow; and
    (h) generating a final estimated optical flow by performing steps (c)-(g) for each level of the pyramid.

2. The method of claim 1, wherein the step of refining comprises:
    applying a symmetrical constraint to at least one non-occluded region; and
    iteratively performing steps (c)-(f).

3. The method of claim 2, wherein the symmetrical constraint comprises setting the forward optical flow equal to a negative of the backward optical flow.

4. The method of claim 1, wherein the color segmentation step is performed using a mean-shift algorithm.

5. The method of claim 1, wherein the at least occluded region is detected by formulating the occlusion in an energy function.

6. The method of claim 1, wherein the color-based bilateral filtering step comprises the application of an adaptive bilateral filter configured to:
    block flow propagation between the plurality of color-segmented regions; and
    infer at least one flow vector for the at least one occluded region based at least in part on surrounding non-occluded regions.

7. The method of claim 1, wherein the step of generating the final estimated optical flow comprises expanding the refined forward optical flow and the refined backward optical flow to a next level of the pyramid and doubling a magnitude of the refined forward optical flow and the refined backward optical flow.

8. A system for estimating optical flow based on a first image frame and a second image frame of an input video stream, the system comprising at least one module configured to:
    (a) generate a pyramid model for each of the first image frame and the second image frame, wherein each pyramid model comprises a plurality of levels;
    (b) perform color segmentation for each level of the pyramid models to produce a plurality of color-segmented regions;
    (c) estimate a forward optical flow between the first image frame and the second image frame, and detect at least one occluded region between the first image frame and the second image frame;
    (d) perform color-based bilateral filtering on the estimated forward optical flow;
    (e) estimate a backward optical flow between the second image frame and the first image frame, and detect at least one occluded region between the second image frame and the first image frame;
    (f) perform color-based bilateral filtering on the estimated backward optical flow;
    (g) refine the estimated forward optical flow and backward optical flow; and
    (h) generate a final estimated optical flow by performing steps (c)-(g) for each level of the pyramid.

9. The system of claim 8, wherein the at least module is configured to:
    apply a symmetrical constraint to at least one non-occluded region; and
    iteratively perform steps (c)-(f).

10. The system of claim 9, wherein the symmetrical constraint comprises setting the forward optical flow equal to a negative of the backward optical flow.

11. The system of claim 8, wherein the color segmentation is performed using a mean-shift algorithm.

12. The system of claim 8, wherein the at least one occluded region is detected by formulating the occlusion in an energy function.

13. The system of claim 8, wherein the at least one module comprises an adaptive bilateral filter configured to:
   block flow propagation between the plurality of color-segmented regions; and
   infer at least one flow vector for the at least one occluded region based at least in part on surrounding non-occluded regions.

14. The system of claim 8, wherein the at least one module is configured to generate the final estimated optical flow by expanding the refined forward optical flow and the refined backward optical flow to a next level of the pyramid and doubling a magnitude of the refined forward optical flow and the refined backward optical flow.

15. A computer-readable storage medium storing computer code for estimating optical flow based on a first image frame and a second image frame of an input video stream, wherein the computer code comprises:
   code for: (a) generating a pyramid model for each of the first image frame and the second image frame, wherein each pyramid model comprises a plurality of levels;
   code for: (b) performing color segmentation for each level of the pyramid models to produce a plurality of color-segmented regions;
   code for: (c) estimating a forward optical flow between the first image frame and the second image frame, wherein the estimation comprises detecting at least one occluded region between the first image frame and the second image frame;
   code for: (d) performing color-based bilateral filtering on the estimated forward optical flow;
   code for: (e) estimating a backward optical flow between the second image frame and the first image frame, wherein the estimation comprises detecting at least one occluded region between the second image frame and the first image frame;
   code for: (f) performing color-based bilateral filtering on the estimated backward optical flow;
   code for: (g) refining the estimated forward optical flow and backward optical flow; and
   code for: (h) generating a final estimated optical flow by performing steps (c)-(g) for each level of the pyramid.

\* \* \* \* \*